J. H. MULFORD.
Watch Escapement.
No. 2,465. Patented Feb. 21, 1842.
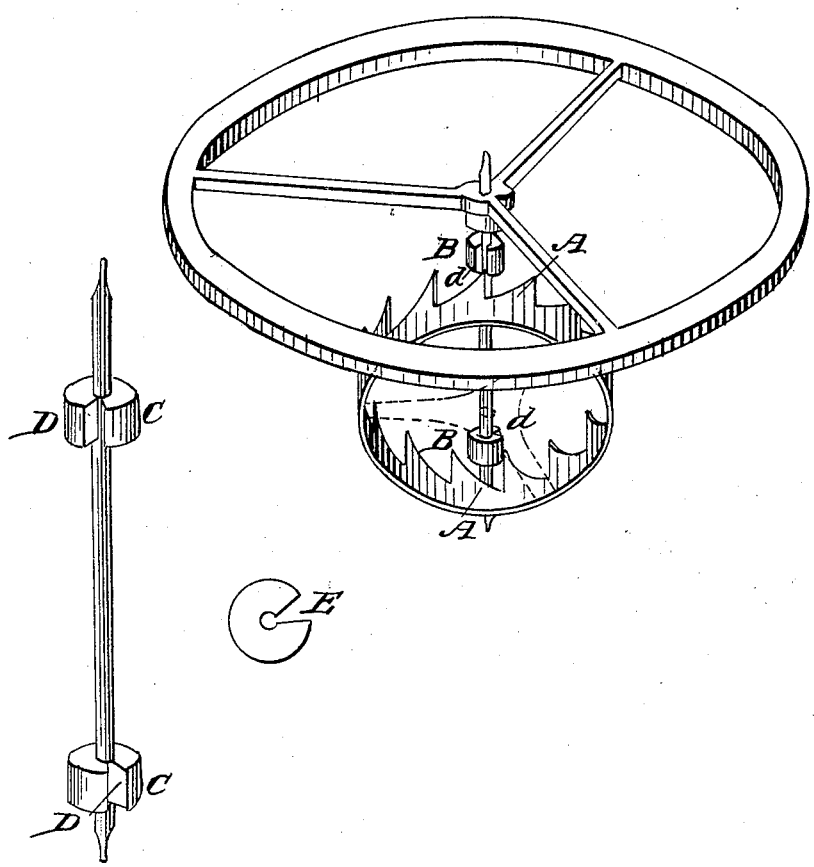

UNITED STATES PATENT OFFICE.

JOHN H. MULFORD, OF ALBANY, NEW YORK.

ESCAPEMENT OF WATCHES.

Specification of Letters Patent No. 2,465, dated February 21, 1842.

*To all whom it may concern:*

Be it known that I, JOHN H. MULFORD, of the city and county of Albany and State of New York, have invented a new and Improved Escapement for Clocks and Watches, of which the following is a full and correct description.

The improved escapement consists of a balance, balance spring, balance wheel, balance staff or axis, with the rollers or cylinders hereinafter described.

The balance wheel is composed of brass, steel, or other metal in shape like the ordinary crown balance wheel of the verge watch with an uneven number of teeth, which may be cut more or less pointed or obtuse and have their acting or contact faces or edges either parallel with the axis of the wheel or more or less inclined to or from the edge of the hollow cylindrical, or drum like body of the wheel in which they are cut. The part of this balance wheel material to this specification is represented by A, A, in the annexed drawings. The axis, arms, and common pinion of the wheel in ordinary use having been omitted in the drawing that the other parts may be the better seen. The balance and balance spring, may be any of those in common use, and upon the axis or staff of the balance are placed two notched rollers, or cylinders composed of diamond, ruby, steel, or any other sufficiently hard stone or substance similar to the roller or cylinder of the duplex watch represented at B, B, and also enlarged at C, C, in the annexed drawings.

In each of these rollers, is a deep angular notch cut down in such a manner that its faces are in planes passing through the axis of the balance. This notch is of sufficient width to receive freely the points of the teeth of the balance wheel and is represented at D, D, and *d, d,* in the drawings. These rollers are of a diameter equal to about two thirds of the distance between the points of the teeth of the balance wheel, and are placed upon the axis or staff of the balance at the distance from each other of the diameter of the balance wheel, and when they are placed in their proper position, in which their axis is vertical, while the axis of the balance wheel is horizontal they are at opposite sides of the balance wheel and so near that the teeth of the balance wheel strike sufficiently deep into the notches to give an impulse to the rollers and balance. The two rollers are placed upon their axis on the balance staff in such a manner that corresponding faces or sides of the notches in the two rollers are in planes of the axis, forming an angle at the axis of about forty to fifty degrees, as represented at D, D, in the drawings, so that when a tooth on the upper side of the balance wheel has given an impulse to the balance and escaped from the notch of the upper roller, a tooth upon the lower side falls upon the lower roller near the notch and remains resting upon the surface of the roller while the motion given to the balance by the upper tooth is expended, and until the reversed motion of the balance given by the balance spring, brings the notch back to the resting tooth which then falls into the notch, gives a new impulse to the balance and escapes, when another tooth upon the upper side falls upon the upper roller, remains resting upon the surface during the oscillation of the balance, falls into the notch acts and escapes and so on giving a constant and regular motion to the balance.

At E in the drawings is represented a horizontal section of the notched roller or cylinder. The notches may be of greater or less width, and may be placed upon the axis at a greater or less angular distance from each other always however preserving enough cylindrical surface for the teeth to rest upon during the vibrations, and such a relative position of the faces of the notches acted upon by the teeth as will permit the teeth after resting upon the surface to fall into the notches in time to continue the motion of the balance.

The superiority of this escapement consists in its regularity in action, and in the simple manner in which it can be adjusted and repaired. The rollers or cylinders form a detent or resting place for the balance wheel during the vibrations of the balance and secure the wheels from the recoil or backward motion always exhibited in the verge watch. By this means a greater or less degree of force in the maintaining power will not alter the rate of going, and if the balance be made of the proper weight and diameter the watch will go equally well without the fusee or wheel used in the verge watch, as a compensation for the varying force of the mainspring. A balance of greater weight can be used, and the arc of vibration will be much greater than in the verge watch, and if the ruby or stone rollers are used, the balance will continue its motion for a longer time, will give less friction and wear, and the great extent of cylindrical surface given for the balance wheel teeth to rest upon will permit the whole motive force to be expended in the vibration, so as to require no banking pin, which is required in all verge watches.

The crown balance wheel, balance and spring used in this escapement being in common use and the rollers being like the roller in the "duplex watch" what I claim as my own invention and for which I seek Letters Patent is—

The use, application, combination and manner of adjustment of the common crown balance wheel with the two notched rollers forming the peculiar "escapement" above described.

J. H. MULFORD.

Witnesses:
C. M. JENKINS,
WM. WENDELL.